United States Patent [19]

Steinman

[11] 3,920,818

[45] Nov. 18, 1975

[54] 1-POLYFLUOROALKYL-1,4-BENZODIAZE-PIN-2-THIONES FOR EFFECTING TRANQUILIZATION, SEDATION AND TREATING COLVULSIONS

[75] Inventor: Martin Steinman, Livingston, N.J.

[73] Assignee: Schering Corporation, Kenilworth, N.J.

[22] Filed: July 31, 1974

[21] Appl. No.: 494,002

Related U.S. Application Data

[60] Division of Ser. No. 275,396, July 26, 1972, Pat. No. 3,845,039, which is a continuation-in-part of Ser. No. 220,370, Jan. 24, 1972, abandoned, which is a continuation-in-part of Ser. No. 62,164, Aug. 7, 1970, abandoned.

[52] U.S. Cl. ................................................ 424/244
[51] Int. Cl. ............................................ A61k 31/33
[58] Field of Search ................................... 424/244

*Primary Examiner*—Stanley J. Friedman
*Attorney, Agent, or Firm*—Bruce M. Eisen; Stephen B. Coan

[57] ABSTRACT

Disclosed herein are 1-polyfluoroalkyl-1,4-benzodiazepin-2-thiones, a new class of chemical compounds particularly useful as sedatives, anti-anxiety agents and anti-convulsants.

3 Claims, No Drawings

1-POLYFLUOROALKYL-1,4-BENZODIAZEPIN-2-THIONES FOR EFFECTING TRANQUILIZATION, SEDATION AND TREATING COLVULSIONS

This is a division of application Ser. No. 275,396 filed July 26, 1972, now U.S. Pat. 3,845,039, which is a continuation-in-part of my copending application Ser. No. 220,370 filed Jan. 24, 1972, now abandoned, which in turn is a continuation-in-part of Ser. No. 62,164 filed Aug. 7, 1970, now abandoned.

This invention relates to chemical compounds which may be considered generically as 1-(polyfluoroalkyl)-5-aryl-2H-1,4-benzodiazepin-2-thiones and to process for making and using such compounds. These compounds beneficially affect mammalian central nervous systems and particularly are useful as sedative-hypnotic agents, anti-anxiety agents and anti-convulsants. The compounds of this invention may be represented by the structural formula:

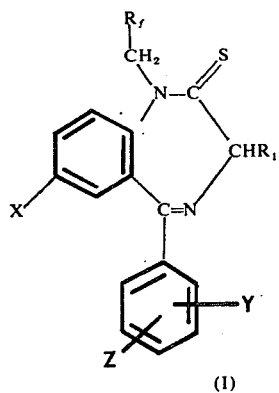

(I)

wherein X is a member of the group consisting of chloro, bromo, trifluoromethyl and nitro; Y and Z are independently selected from the group consisting of hydrogen, halogen, and trifluoromethyl; $R_f$ is a polyfluoro-lower alkyl group; $R_1$ is hydrogen or a lower alkyl group; and the pharmaceutically acceptable salts thereof.

As used herein, the terms "lower alkyl" refer to both straight and branched-chain hydrocarbon radicals having up to six carbon atoms such as methyl, ethyl, propyl, isopropyl, n-butyl, t-butyl, cyclopropylmethyl and the like. The term "halogen" as used herein comprehends fluorine, chlorine, bromine and iodine. Chloro is the preferred X substituent. Preferably Z is hydrogen and Y is ortho-halo, with ortho-fluoro being especially preferred.

The term "polyfluoro-lower alkyl" refers to lower alkyl radicals substituted with more than one fluoro radical and includes such moieties as trifluoromethyl, difluoromethyl, 1,2,2,2-tetrafluoroethyl, pentafluoroethyl, 2,2,3,3,3-pentafluoropropyl, pentafluorocyclopropyl and the like. In the preferred embodiment of this invention, $R_f$ is trifluoromethyl, i.e. the 1-(2,2,2-trifluoroethyl) species. The preferred compound of this invention is 7-chloro-1-(2,2,2-trifluoroethyl)-1,3-dihydro-5-(2-fluorophenyl)-2H-1,4 benzodiazepin-2-thione.

The compounds may be used in the form of their therapeutically acceptable salts. Such salts include those formed in the conventional manner with both inorganic and organic acids such as hydrochloric acid, hydrobromic, nitric acid, sulfuric acid, acetic acid, formic acid, succinic acid, maleic acid, p-toluenesulfonic acid and the like.

The compounds of formula I can be prepared by the reaction of the corresponding benzodiazepin-2-one with a thiating agent such as phosphorus pentasulfide, which reaction can be depicted as follows:

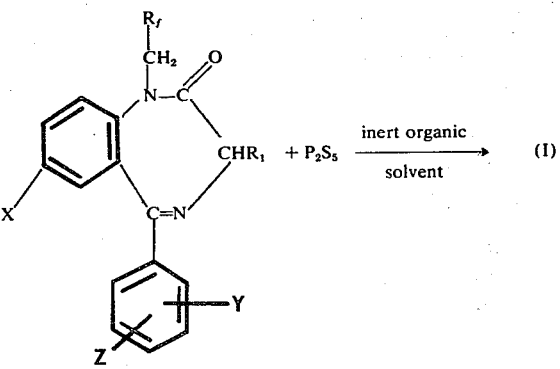

wherein X, Y, Z, $R_f$ and $R_1$ have the above meaning. Suitable inert organic solvents include p-dioxane, pyridine, dimethylaniline, tetralin, quinoline, the xylenes and the like.

The following examples illustrate the preparation of representative compounds of this invention.

EXAMPLE 1

Preparation of 7-chloro-1-(2,2,2-trifluoroethyl)-1,3-dihydro-5-phenyl-2H-1,4-benzodiazepin-2-thione To a solution of 25.0 grams of 7-chloro-1-(2,2,2-trifluoroethyl)-1,3-dihydro-5-phenyl-2H-1,4-benzodiazepin-2-one (0.071 mole) in 250 ml. of p-dioxane is added 17.31 grams of phosphorous pentasulfide (0.078 mole). The mixture is refluxed for 5 hours and then the solvent is removed under reduced pressure. The residue is diluted with methylene chloride and filtered through 375 grams of alumina; the same solvent is used for elution. The impure product thus obtained is then chromatographed on 1 kilogram of silica gel, using benzene as the eluent. The pure product is recrystallized from methylene chloride-cyclohexane and yields 8.73 grams of the title compound, m.p. 169°–170°C.

EXAMPLE 2

Preparation of 7-chloro-1-(2,2,2-trifluoroethyl)-1,3-dihydro-5-(2-fluorophenyl)-2H-1,4-benzodiazepin-2-thione 7-Chloro-1-(2,2,2-trifluoroethyl)-1,3-dihydro-5-(2-fluorophenyl)-2H-1,4-benzodiazepin-2-one is substituted for the starting material in Example 1. This compound can be prepared by the oxidation of the corresponding 2,3-dihydrobenzodiazepine as described, for example, in my copending patent application Ser. No. 11,336. Suitable oxidizing agents include the metal oxides such as ruthenium tetraoxide and chromic trioxide.

To a solution of 1.8 grams 7-chloro-1,3-dihydro-5-o-fluorophenyl-1-(2,2,2-trifluoroethyl)-2H-1,4-benzodiazepin-2-thione (0.005 mole) in 20 ml. of anhydrous p-dioxane is added 1.1 gram phosphorous pentasulfide (0.005 mole). The mixture is boiled under reflux for 4 hours with a calcium chloride drying tube to protect from atmospheric moisture. The solution is evaporated in vacuo. The residue is dissolved in methylene chloride and filtered through 200 grams of silica gel in a column. After concentration of the filtrate the residue is crystallized from methylene chloride-hexane and yields 1.2 grams of the title compound, m.p. 137.5°–139°C.

In a similar manner by substituting the corresponding 1-polyfluoroalkyl-1,4-benzodiazepin-2-one in the process of Example 1, one can prepare:

7-Bromo-1-(2,2,2-trifluoroethyl)-1,3-dihydro-5-(2-fluorophenyl)-2H-1,4-benzodiazepin-2-thione 7-Nitro-1-(2,2,2-trifluoroethyl)-1,3-dihydro-5-(2-fluorophenyl)-2H-1,4-benzodiazepin-2-thione 7-Chloro-1-(2,2,2-trifluoroethyl)-1,3-dihydro-5-(2-chlorophenyl)-2H-1,4-benzodiazepin-2-thione 7-Bromo-1-(pentafluorocyclopropyl) methyl-1,3-dihydro-5-(2,6-difluorophenyl)-2H-1,4-benzodiazepin-2-thione 7-Trifluoromethyl-1-(2,2-difluoroethyl)-1,3-dihydro-5-(3-bromophenyl) -2H-1,4-benzodiazepin-2-thione 7-Chloro-1-(3,3,3-trifluoropropyl)-1,3-dihydro-5-(3-trifluoro-methylphenyl)-2H-1,4-benzodiazepin-2-thione 7-Bromo-1-(2,2,3,3,3-pentafluoropropyl)-1,3-dihydro-3-methyl-5-(4-iodophenyl)-2H-1,4-benzodiazepin-2-thione.

The compounds of this invention exert such selective effects on the mammalian central nervous system as to be particularly useful as sedatives, anti-anxiety agents, and anti-convulsants. In pharmacological testing there has been observed significant differentials between those doses which elicit sedative, tranquilizing and anti-convulsant effects and those doses which cause neurological impairment (ataxia). Benzo-diazepines currently suggested as sedatives do not appear to attain maximum levels of sedation. This may reflect a behavioral stimulant effect which occurs in at least some individuals and counteracts the sedation. The compounds of this invention tend to be free of this undesirable stimulant side effect.

Based upon standard laboratory investigative procedures such as the Antagonism of Pentylene Tetrazole, Everett and Richard, J. Pharm. and Exp. Ther., Vol. 81, pg. 402 (1944) and Antagonism of Maximal Electro-Shock-Induced Seizures in Mice, Synward, E. A. et al., J. Pharm. and Exp. Ther., Vol. 106, pg. 319 (1952) for anti-convulsant activity; and Antagonism of Foot-Shock Induced Fighting in Mice, Tedeschi, et al., J. Pharm. and Exp. Ther., Vol. 125, pg. 28 (1959) and Taming Activity in Monkeys, Randall, Diseases of the Nervous System, Vol. 21, pg. 7 (1960) for anti-anxiety activity; the Central Nervous System Activity and Acute Toxicity, Irwin, Science 136, pg. 123 (1967) and squirrel monkey studies for sedative-hypnotic effects; it is indicated that when used as an anti-convulsant in man the dosage range is about 0.005 to 0.5 mg./kg. of body weight per day, preferably orally administered in divided doses. Similarly, when used as an anti-anxiety agent in man the dosage range of the subject compound is about 0.03 to 3 mg./kg. of body weight per day, preferably administered orally in divided dosages. In like manner, when used as a sedative in man the dosage range is about 0.06 to 2.5 mg./kg. of body weight preferably orally administered in a single dose.

The compounds of this invention may be administered alone or combined with other medicaments. In any event, a suitable pharmaceutically acceptable carrier is generally employed. A carrier is selected taking account of the intended route of administration, the physical properties of the compounds, and standard pharmaceutical practice. It should not react chemically with the compound to be administered. The compositions of this invention are preferably administered orally, although parenteral administration is also contemplated. The preparations containing the active ingredients of this invention may be in the form of tablets, capsules, syrups, elixirs, suspensions and the like.

In the formulations of pharmaceutical preparations there can be employed such pharmaceutically acceptable diluents, as for example, water, gelatin, lactose, starches, magnesium stearate, talc, vegetable oils and gums. The following examples show typical tablet and capsule formulations incorporating the preferred compound of this invention.

Tablet Formulations

I. Formula and Method of Manufacture for 7-chloro-1-(2,2,2-trifluoroethyl)-1,3-dihydro-5-(2-fluorophenyl)-2H-1,4-benzodiazepin-2-thione.

| Coated Tablets: | mg/core |
|---|---|
| 7-Chloro-1-(2,2,2-trifluoroethyl)-1,3-dihydro-5-(2-fluorophenyl)-2H-1,4-benzodiazepin-2-thione | 4 |
| Lactose, USP | 62 |
| Dicalcium Phosphate | 40 |
| Sodium Lauryl Sulfate | 10 |
| Polyvinylpyrrolidone | 10 |
| Water 50 ml/1000 cores | |
| Corn Starch | 20 |
| Dry | mg/core |
| Sodium Lauryl Sulfate | 2 |
| Magnesium Stearate | 2 |
| Tablet Weight | 150 |

Procedure

The 7-chloro-1-(2,2,2-trifluoroethyl)-1,3-dihydro-5-(2-fluorophenyl)-2H-1,4-benzodiazepin-2-thione is mixed with the lactose, dicalcium phosphate, and sodium lauryl sulfate. The above mixture is screened through a No. 60 screen and granulated with an aqueous solution containing polyvinylpyrrolidone. Add additional water, if necessary, to bring powders to a pasty mass. Add corn starch and continue mixing until uniform granules are formed. Pass through a No. 10 screen, tray and dry in oven at 100°C for 12–14 hours. Reduce dried granulation through a No. 16 screen, add sodium lauryl sulfate and magnesium sulfate, mix and compress into desired shape on a tablet machine.

Coating

The above cores are treated with a lacquer and dusted with talc to prevent moisture absorption. Sub-coat layers are added to round out the core. A sufficient number of lacquer coats are applied to make the core enteric. Additional sub-coats and smoothing coats are applied to completely round out and smooth the tablet. Color coats are applied until desired shade is obtained. After drying, the coated tablets are polished to give the tablets an even gloss.

II. Capsule Formulations:

| Formula: | mg/capsule |
|---|---|
| 7-Chloro-1-(2,2,2-trifluoroethyl)-1,3-dihydro-5-(2-fluorophenyl)-2H-1,4-benzodiazepin-2-thione | 4 |
| Sodium Lauryl Sulfate | 20 |
| Lactose | 150 |
| Magnesium Stearate | 76 |
| | 250 |

Procedure

Mix together 7-chloro-1-(2,2,2-trifluoroethyl)-1,3-dihydro-5-(2-fluorophenyl)-2H-1,4-benzodiazepin-2-thione, sodium lauryl sulfate and lactose. Pass through a No. 80 screen. Add magnesium stearate; mix and encapsulate into the proper size two-piece gelatin capsule.

III. Suppository

| Formula: | mg/2gs. |
|---|---|
| 7-Chloro-1-(2,2,2-trifluoroethyl)-1,3-dihydro-5-(2-fluorophenyl)-2H-1,4-benzodiazepin-2-thione, micronized | 8 |
| Theobroma Oil, Pharm. Grade to make | 2 gms. |

Method of Preparation

Prepare a slurry of the 7-chloro-1-(2,2,2-trifluoroethyl)-1,3-dihydro-5-(2-fluorophenyl)-2H-1,4-benzodiazepin-2-thione with a portion of the melted theobroma oil to bring the batch to final weight. Pour the melted mix, while maintaining uniformity, into appropriately prepared molds and allow to cool.

Numerous variations of the above compositions of matter and processes for the manufacture will be apparent to one skilled in the art within the spirit of the present invention.

What is claimed is:

1. A method for effecting tranquilization comprising administering to a mammal exhibiting symptoms of anxiety 7-chloro-1-(2,2,2-trifluoroethyl)-1,3-dihydro-5-(2-fluorophenyl)-2H-1,4-benzodiazepin-2-thione or a pharmaceutically acceptable salt thereof in an amount sufficient to effect tranquilization.

2. A method for effecting sedation comprising administering to a mammal 7-chloro-1-(2,2,2-trifluoroethyl)-1,3-dihydro-5-(2-fluorophenyl)-2H-1,4-benzodiazepin-2-thione or a pharmaceutically acceptable salt thereof in an amount sufficient to effect sedation.

3. A method for inhibiting convulsions comprising administering to a convulsion-prone mammal 7-chloro-1-(2,2,2-trifluoroethyl)-1,3-dihydro-5-(2-fluorophenyl)-2H-1,4-benzodiazepin-2-thione or a pharmaceutically acceptable salt thereof in an amount sufficient to inhibit convulsions.

* * * * *

UNITED STATES PATENT AND TRADEMARK OFFICE

CERTIFICATE EXTENDING PATENT TERM
UNDER 35 U.S.C. 156

Patent No.    : 3,920,818

Dated         : November 18, 1975

Inventor(s)   : Martin Steinman

Patent Owner  : Schering Corporation

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Twenty-second day of December 1987.

Donald J. Quigg

Assistant Secretary and Commissioner of Patents and Trademarks